(12) United States Patent
Haggarty

(10) Patent No.: US 9,736,994 B2
(45) Date of Patent: Aug. 22, 2017

(54) LIGHTING DEVICE, ASSEMBLY AND METHOD FOR GROWING HORTICULTURE INDOORS

(71) Applicant: Edward Leonard Haggarty, Lakewood, WA (US)

(72) Inventor: Edward Leonard Haggarty, Lakewood, WA (US)

(73) Assignee: Edward Leonard Haggarty, Lakewood, WA (US)

( * ) Notice: Subject to any disclaimer, the term of this patent is extended or adjusted under 35 U.S.C. 154(b) by 0 days.

(21) Appl. No.: 14/828,465

(22) Filed: Aug. 17, 2015

(65) Prior Publication Data

US 2016/0192598 A1    Jul. 7, 2016

Related U.S. Application Data

(60) Provisional application No. 62/038,860, filed on Aug. 19, 2014.

(51) Int. Cl.
| | |
|---|---|
| *A01G 1/00* | (2006.01) |
| *A01G 7/04* | (2006.01) |
| *H05B 37/02* | (2006.01) |
| *H05B 33/08* | (2006.01) |
| *F21Y 115/10* | (2016.01) |
| *F21Y 113/13* | (2016.01) |
| *F21S 8/06* | (2006.01) |

(52) U.S. Cl.
CPC ......... *A01G 7/045* (2013.01); *H05B 33/0845* (2013.01); *H05B 37/0281* (2013.01); *F21S 8/061* (2013.01); *F21Y 2113/13* (2016.08); *F21Y 2115/10* (2016.08); *Y02P 60/149* (2015.11)

(58) Field of Classification Search
None
See application file for complete search history.

(56) References Cited

U.S. PATENT DOCUMENTS

| 6,921,182 | B2 | 7/2005 | Anderson, Jr. et al. | |
|---|---|---|---|---|
| 8,458,954 | B2 * | 6/2013 | Yamada ................ | A01G 7/045 250/504 R |
| 8,525,420 | B2 | 9/2013 | Summerford et al. | |
| 8,579,465 | B2 * | 11/2013 | Yamada ................ | A01G 7/045 315/323 |
| 2016/0037730 | A1 * | 2/2016 | Whittingham ......... | H05B 41/38 315/182 |

* cited by examiner

*Primary Examiner* — Dedei K Hammond

(57) ABSTRACT

A lighting device and assembly which incorporating an independently powered array of at least two types of LED lights that each give off specific wavelengths of light for growing plants. The assembly includes at least two of the lighting devices in conjunction with at least one high intensity bulb commonly used for indoor horticulture, where the assembly is adjustable for dimensional changes in the subject plants as they grow. A timing method for applying specific durations of each type of light which effectively simulate sunrise, daylight and sunset by allowing the plant to awaken naturally, absorb more light during the day and prepare for sleep at night, giving the plant more rest—all leading to more healthy plant growth.

8 Claims, 8 Drawing Sheets

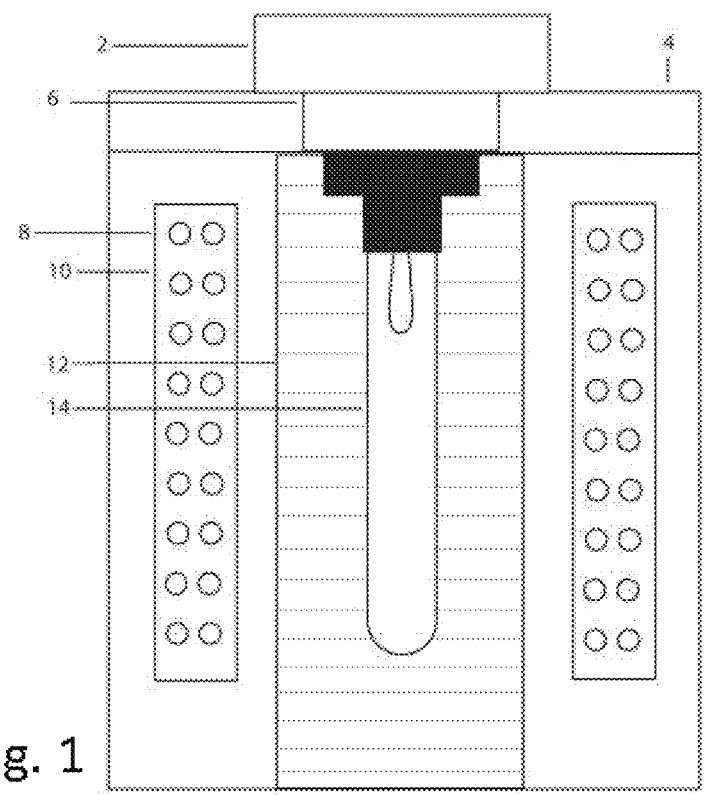
Fig. 1
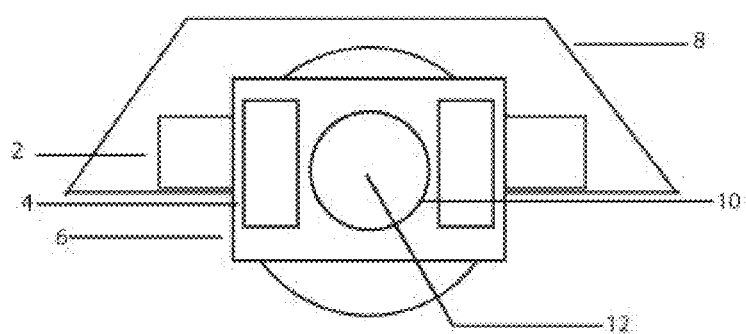
Fig.2
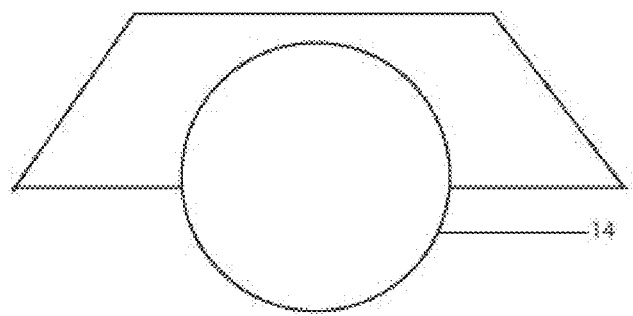

LIGHTING DEVICE, ASSEMBLY AND METHOD FOR GROWING HORTICULTURE INDOORS

CROSS-REFERENCE TO RELATED APPLICATIONS

This application claims priority to U.S. Provisional Application No. 62/038,860 filed Aug. 19, 2014. The content of the above application is incorporated by reference in its entirety.

FIELD OF THE DISCLOSURE

This disclosure relates generally to the field of lighting systems used for plant growth, particularly indoor horticulture.

BACKGROUND

Photoperiodism is a quality of most plants that controls a plant's response to changes in light. Diurnal, or day and night, changes in light are cues to the plant to undertake certain responses, and in many plants the length of day or night is itself a cue. These responses include germination of seeds, start of flowering, and smaller, more granular changes like nighttime processes that plants undertake when not actively photosynthesizing.

Indoor horticulture has been able to reproduce and in some cases enhance natural processes to permit plants to be grown without natural sunlight, or, in some cases, with supplemental light in addition to natural sunlight. Current methods of providing horticultural lighting are similar to those used in other lighting applications, usually involving a single incandescent bulb or multiple LED chips to provide a varying spectrum of light and employing a simple analog on-off switch. None of the current methods include offset timing for different spectra. Such methods do not adequately simulate natural sunrise and sunset conditions that some plants require to switch between daytime and nighttime activities. Such methods also do not allow enhanced photoperiodic responses that can be obtained by offset timing for specific spectra.

Plants use a photosensitive pigment to detect light. One of these, phytochrome detects light in the red and far red spectrum and affects plant signals to "wake" or "sleep." Different important biological processes occur in plants during these times. In addition to the time of day, many plants track the length of days with phytochrome and related systems; this allows, for example, a plant to know when the days are getting shorter in the fall, signaling the best time to convert from producing vegetative tissues to producing flowering tissues.

Reference to, and discussion of, the foregoing background is not presented as prior art and is respectfully submitted that none of the above-indicated patents and patent applications disclose, teach, suggest, show, or otherwise render obvious, either singly or when considered in combination, the invention described and claimed herein.

For the foregoing reasons, there is a need for a lighting system that provides offset timing for different light sources and spectra.

SUMMARY

The disclosure presented herein relates to lighting for plant growth; particularly lighting used for indoor horticulture. The apparatus, system and method described herein uses a combination of different types of lighting devices connected to a system that when performed per a specific method, replicates the effects of sunrise and sunset by providing certain wavelengths of light at certain times. In some embodiments, the sunrise/sunset response of the plants is actually sped up or enhanced by providing measured doses of spectra that affect plant photoperiodism.

Preceding and following embodiments and descriptions are for illustrative purposes only and are not intended to limit the scope of this disclosure. Other aspects and advantages of this disclosure will become apparent from the following detailed description.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

FIG. 1 is a top view of an embodiment of a grow light device.

FIG. 2 is a side view of an embodiment of one lens of a grow light device.

DEFINITIONS

Figure 3:
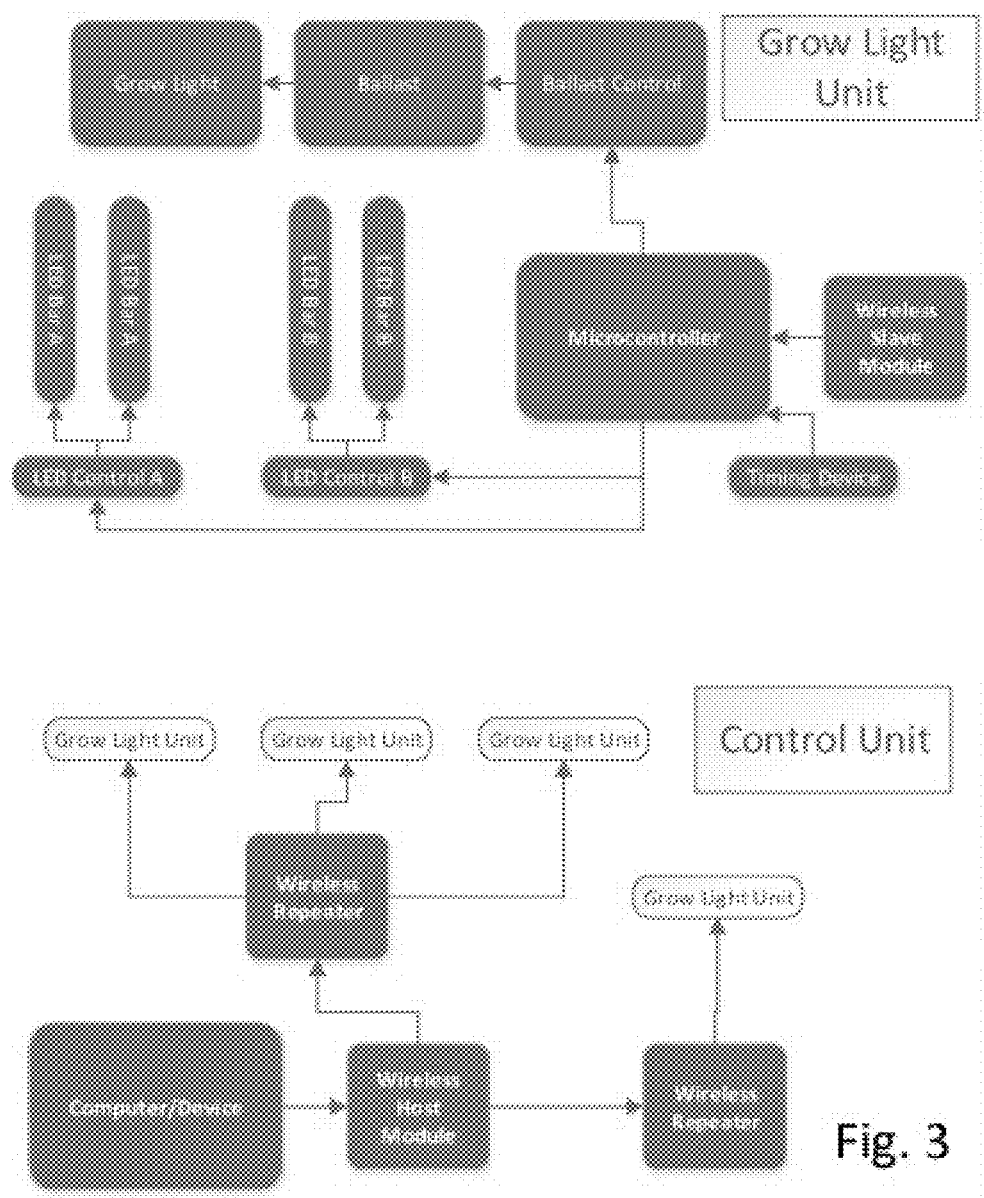
FIG. 3 is a cut-away view of a grow light device and connection to systems.

Grow Light Device: An elongated apparatus which contains, powers and arranges at least one LEDs; is mountable and designed to dissipate heat.

High Intensity Discharge Lamp or "HID Lamp": one of several common types of light-emitting bulbs; the most common of which are high pressure sodium, induction, ceramic metal halide, metal halide, digital, plasma, and fluorescent.

Photoperiodism: the response of a plant to changes in the length of daylight. A plant that responds to length of daylight is called "photoperiodic".

LEDs: a plurality (2 or more) of LED lights embedded onto a printed circuit board, including all electronic elements commonly used on such an array.

Hood: a generally convex unit in which the bulb or other lighting devices are placed, and which causes light from the bulb to be directed by reflection off the internal surface.

Far Red: the wavelength electromagnetic radiation in the 700-760 nm range, preferably 730 nm.

Red: the wavelength of electromagnetic radiation in the 630-690 nm range, preferably 660 nm.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Figure 4:
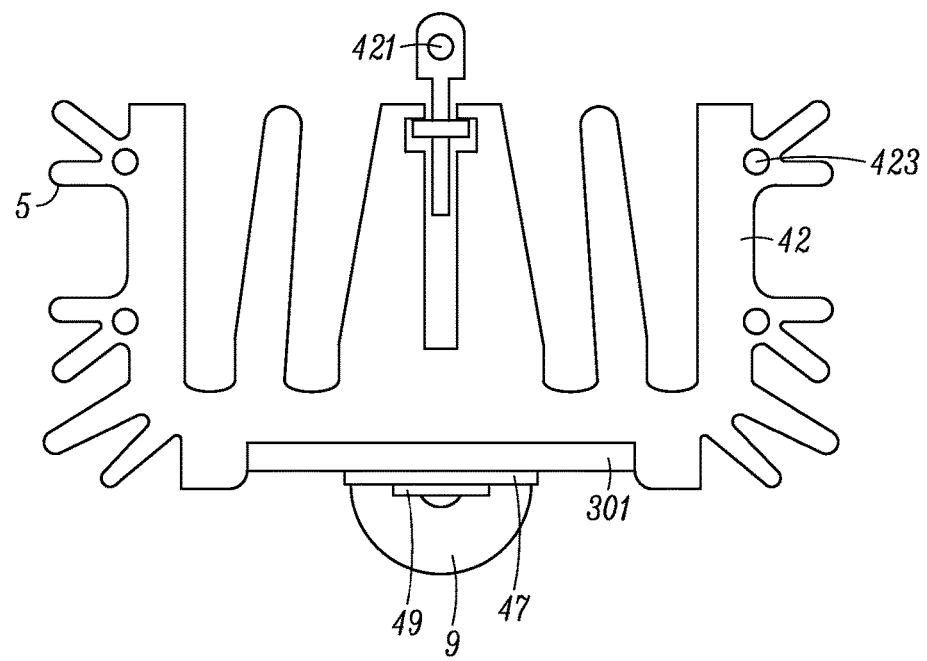
FIG. 4 is a section view of an embodiment of a grow light device.
Figure 5:
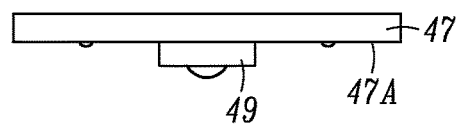
FIG. 5. is a detailed side view of a LED light and attachment.

FIG. 1 shows a preferred version of the grow light device 1 together with two separate power supplies 3. Alternate embodiments may be constructed and powered using just a single power supply. As for the grow light device itself, the shape, size, proportions, and number of components are generally scalable such that any number of lights could be support in such a way so long as the power source(s) can supply enough power. In the preferred embodiment shown in FIG. 1, is a single row of 14 (fourteen) light bulbs 40 are configured along the centerline of the housing 42 of the grow light device. The bulbs are lit by light emitting diodes (LEDs) which are located in the center of the bulbs. In this preferred embodiment, two alternating types of LEDs are used, as shown in FIG. 1 where a red wavelength LED 2 is positioned adjacent to a far red wavelength LED 6 where the next bulb in the row would be a red LED 2 followed by a far-red LED 6 and so on. An alternative embodiment is accomplished by configuring two or more rows of bulbs and LEDs, may be accomplished by having a larger housing, more power and more bulbs. On either side of the bulbs 40 in the preferred embodiment shown in FIG. 1 are lengthwise fins 5 which protrude from the center of and run the length of the housing 42. The fins 5 are preferably metallic and are integral with the housing 42. The fins 5 are a method of providing an air path to cool the housing 42 (also shown well on FIG. 4) and are configured such that they are relatively thin when compared to the body of the housing. As shown in FIG. 4 there can be many fins (in the embodiment shown in FIG. 4 there are 12 fins). The thickness of each fin is no more than 25% the thickness of the housing height. Other methods for cooling may be used instead of these metallic fins such as fan-cooled. Attached to each end of the grow light device 1 is an end cap 4. Each end cap secures wiring, and provides support for power cords 45.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 800 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

As used herein for purposes of the present disclosure, the term "HID lamp" should be understood to include, but not be limited to, any non-LED based lamp that has performance characteristics similar to the group of lamps known as mercury, metal halide, and high pressure sodium. The term HID lamp specifically includes, but is not limited to, inductive discharge lamps that operate using the principal of induction.

An alternative embodiment of the LED grow light device would have all of the LEDs be of either red (630-690 nm) or of all far red (700-760 nm). Yet another embodiment as opposed to a linear grow light device, but for the housing to be in the shape of a circle where the LEDs alternate red then far red, red then far red, etc. Also, with the circular grow light device embodiment, another embodiment where all LEDs in the circular embodiment are all far red or are all red.

FIG. 2 shows a top view and side view of the lens which covers each LED bulb in the grow light device. As shown, there is a base 47 which is made up of preferably metallic materials, but could be made of composite, plastic polymer or other common materials for electrical attachment. Attached to the base 47 is the clear plastic lens 9. The lens 9 is parabolic in shape. Other embodiments of the lens 9 are full 180 degree hemispheres to allow maximum light exposure. Having a parabolic shape as in the preferred embodiment allows for more directed light while allowing for an appropriately wide bath of light. The lens 9 is secured to the base 47 by two simple screw fasteners. The base 47 is fixed to the grow light device circuit board 301, as shown in FIG. 3. Also shown in FIG. 2 and FIG. 3 is the LED bulb 49 which is positioned directly in the center of the base 47.

A preferred embodiment of the power distribution of the grow light device is shown in FIG. 3. Two independent sources 311A and 311B may be used to power two or more separate LED bulbs 49. The power for both LED lights, 311 may be controlled by a wireless controller 312. The wireless controller receives basic signals such as power on or power off for each grow light power source 311A or 311B and then transmits power from one of two power sources 3 to one or more of the grow light device power sources.

An important embodiment of having two or more power distributions is that each power source may power one specific type of LED independently. In this embodiment, the power source 311A powers only those LEDs which are far red wavelengths and require a specific amps, wattage and voltage. Whereas the power source 311B in the same embodiment powers only the red wavelengths which require a different amperage, wattage and voltage. Other embodiments may have three or more power sources for three or more independent LEDs.

FIG. 4 shows a side profile of the grow light device. There are at least two adjustable hanging mounts 421 which are positioned within the housing of the grow light device and on the opposite side as the bulbs. The mounts are adjustable because the housing 42 allows for sliding translation along the length of the grow light device. The adjustable hanging mounts 421, as discussed below are preferably configured to receive a fastener of an angled arm as part of a grow light assembly (See FIG. 6). The grow light device housing 42 is made of highly conductive metallic material, preferably aluminum, titanium or a composite of similar quality. However, other embodiments may be made from ceramic, composite, carbon fiber, among other fibrous plant-based materials. The design of the fins 5 of the grow light device are directed away from the source of energy, the LEDs 49, so that the path of heat energy flows along the ribs and away from the sensitive components of the LEDs 49 and the wiring, circuit board 301 and grow light device generally. Alternative embodiments of the grow light device use other light sources than LEDs which may also be used in the grow light device including but not limited to digital, plasma, high pressure sodium, induction, ceramic metal halide, metal halide, and fluorescent lighting. Also shown is a generally parabolic (alternatively semi-circular/hemispherical) lens 9 that covers at least one LED 49. The lens 9 is secured onto the base 47 which provides magnification and amplification of the light. Each lens 9 in the grow light device magnifies the range of LED coming from the grow light device and provides a wide swath of light (preferably 180 degrees of light) to the plant. The base 47 is made up of reflective material or in some embodiments has a reflective or metallic surface or adhesive. The reflective surface 47A is on the side of the base 47 that the LED 49 protrudes from.

Figure 6:
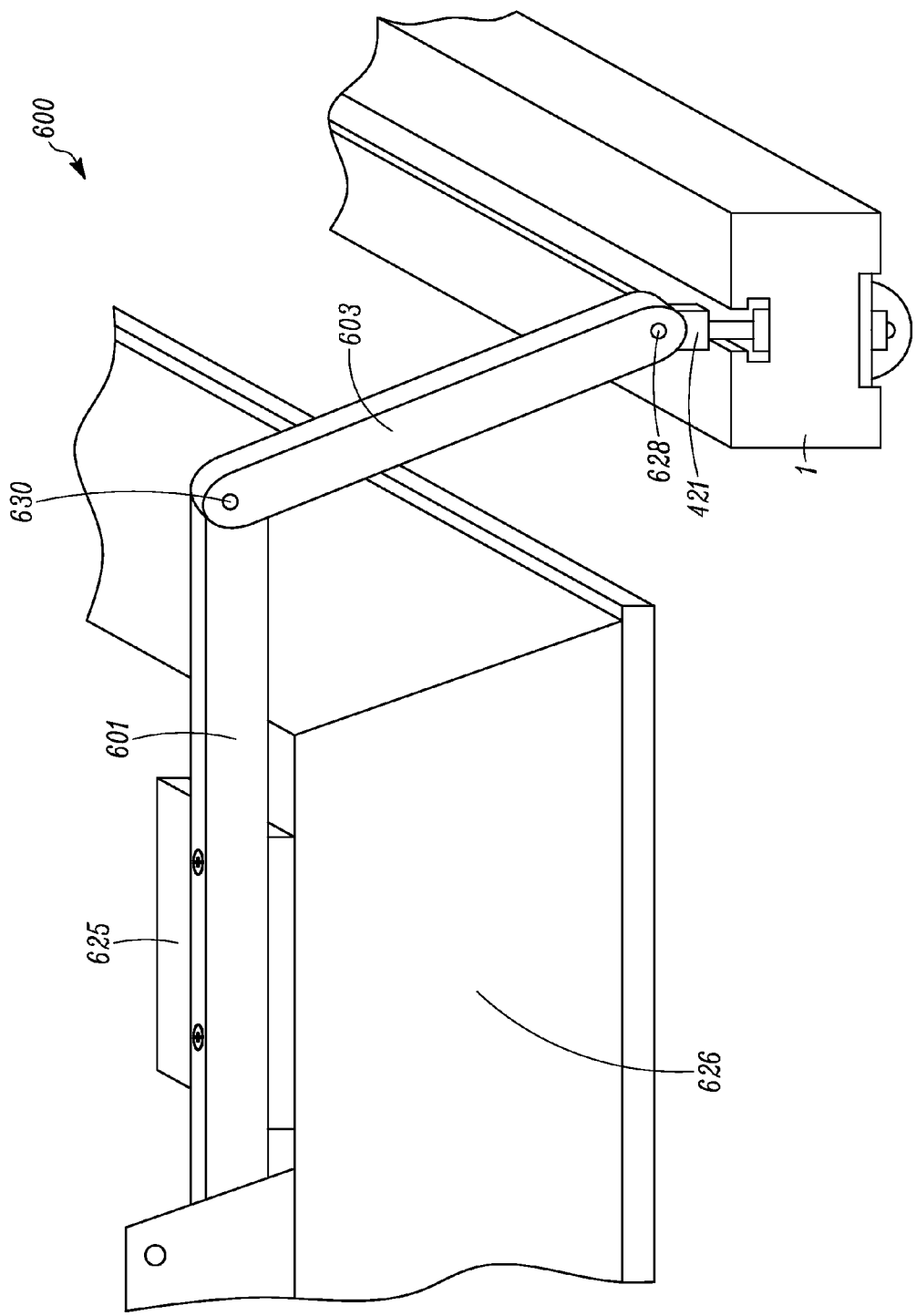
FIG. 6. is an isometric view of an embodiment of a grow light device assembly.

FIG. 6 shows the structure and attachment of the grow light device to the larger, grow light assembly 600. The overall assembly is made up of at least two grow light devices 1 positioned around two opposite ends of a main HID light structure 626. There are horizontal members 601 and angled members 603 which suspend the grow light device 1 beyond the edge of the main HID light structure 626. A preferred embodiment allows the grow light devices 1 on either side to tilt, rotate or swivel about a lower attachment end 628 and upper attachment end 630 of each of at least four angled arms. The lower attachment points 628 are located on at least two locations along the back of the grow light device where two angled members 603 per grow light device are connected on one end to at least two grow light device adjustable hanging mounts 421 and the other side to one of the horizontal members 601 by conventional means of connection such as pin, screw, or joint. Each of the horizontal members 601 are held in place to the HID light structure 626 preferably by non-permanent connection, as shown in FIG. 6, at least one large magnet 625 per horizontal member 601 holds it in place. Other embodiments have permanent fastening means common in the art such as screws, pins, weld, or joints. The horizontal members 601 span across the HID light structure 626 for growing the horticulture. The main HID light structure 626 secures and provides power to at least one HID bulb in a manner consistent with the prior art. However, the preferred embodiment requires separate power sources for at least each of the two grow light devices 1 and the main HID light 626.

Figure 7:
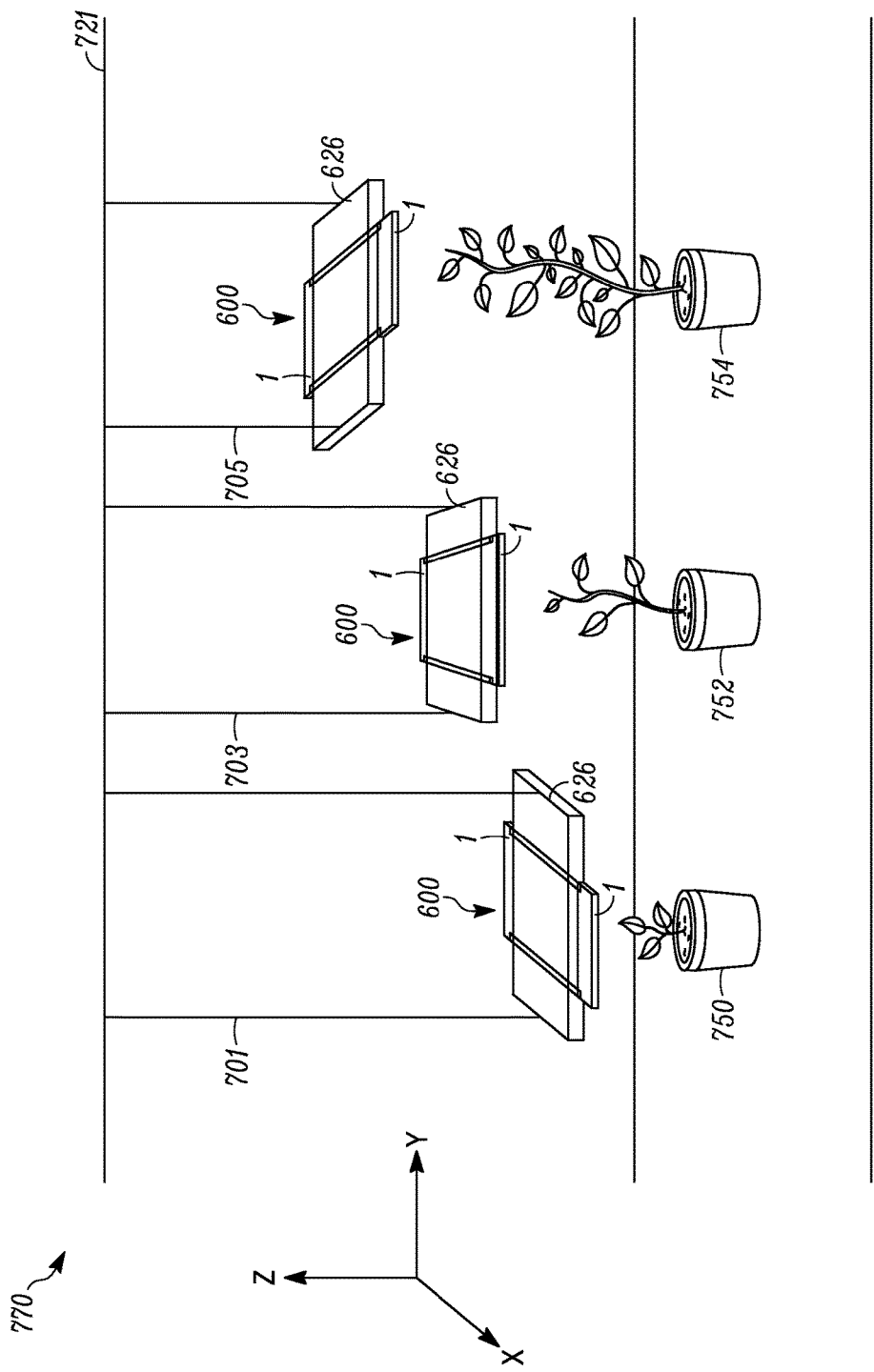
FIG. 7. is a graphical representation of one method over time.

FIG. 7 shows the grow light assembly 600 and the method 770 of adjusting the height and position of the grow light assembly relative to the height and size of the plant. As shown on the left, the grow light assembly may be hung within a specified distance 701 from the plant 750 so that the plant receives an optimal amount of all three lights (HID light and at least two grow lights). While the entire grow light assembly 600 travels predominately along a cable 701 along the z-axis, the two or more grow light devices 1 are each adjustable about both the z-axis through their connection to the main HID light structure but also are rotatable about the y-axis at their connection points with the angled arms. As the plant 752 grows, in the center picture, the grow light assembly translates upward along the z-axis with a smaller cable 703. Alternatively, the cable 701 could simply be shortened or partially used. On the far right, the plant 754 is still growing and the assembly 600 continues to translate upward along the z-axis and a shorter still cable 705 is used. Alternative embodiments would use either longer cables 701 or 703. it can be shown the cables and the grow light assembly are adaptable and preferably move with the plant's growth while maintaining a specified or desirable height above the plant. Similarly, the opposing grow light devices may be adjusted in the y-axis to assure precision exposure relative to the plant's height.

Figure 8:
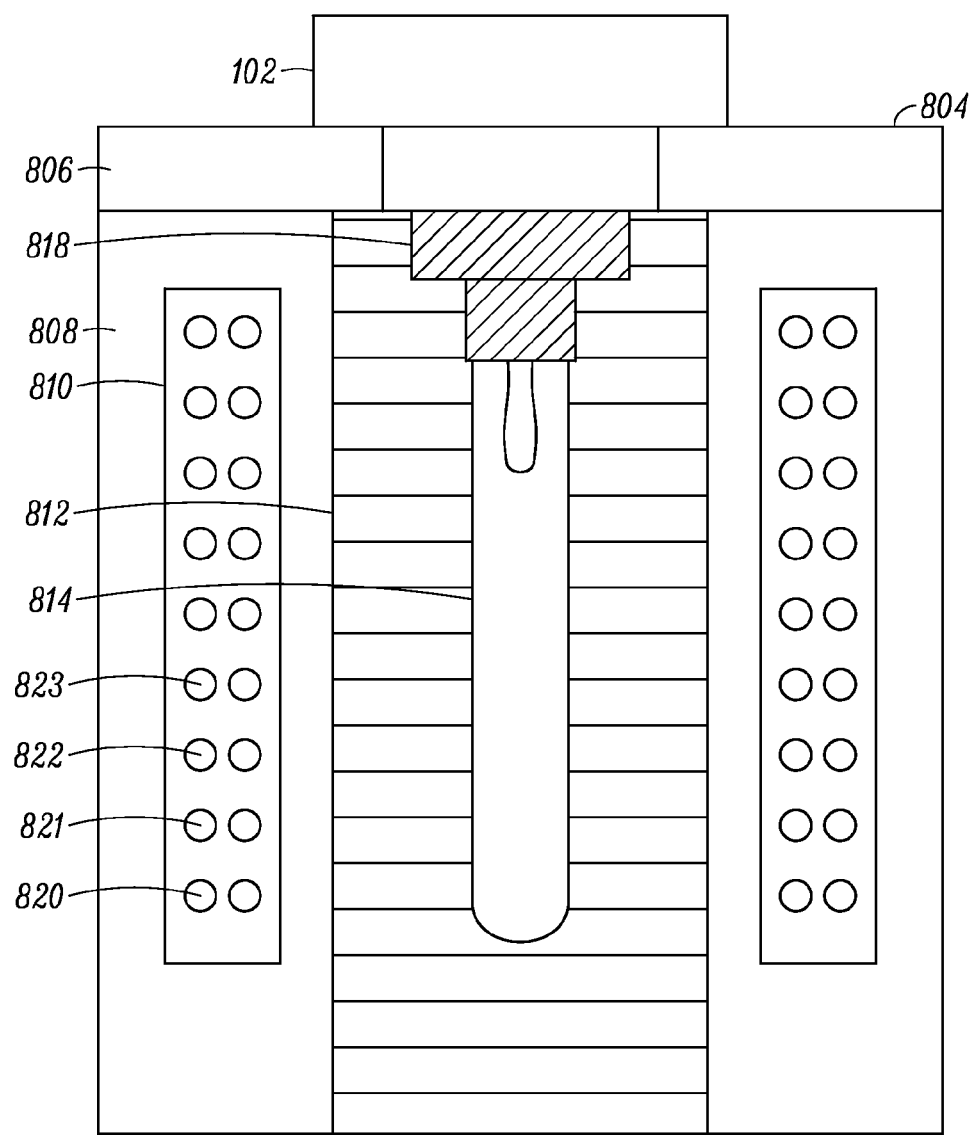
FIG. 8. is a bottom view of an embodiment of the grow light device assembly.

FIG. 8 shows a bottom-up view of one embodiment of the grow light device assembly. The outermost structure is the Hood 808, with a single HID Bulb 814 in the middle flanked by two grow light devices 810 with LEDs. All three are affixed to a Hood so that the light from each is generally directed the same way. The embodiment shown in FIG. 8 has two rows of nine LED lights. The LED lights are alternating in the kind of spectrum they put out. One of the LEDs provides far red spectrum light preferably 660 nm (alternative embodiments may range from 630 nm-690 nm); the other provides red spectrum light preferably 730 nm (alternative embodiments may range from 700 nm-760 nm). Looking at FIG. 8, LED lights 820 and 822 would have the same spectrum of light (either red or far red) and LED lights 821 and 823 would have the opposite spectrum of light as 820 and 822 (either red or far red).

One embodiment of the hood 808 is a generally square or rectangular shape when viewed from the top and trapezoidal from the side, with the larger end towards the bottom. The HID Bulb 814 and LEDs are attached within the interior portion of the hood, which is open on the bottom and closed on the top. The interior of the hood is exposed metal or it is coated or covered with a reflective substance common in the art. The hood 808 is preferably constructed of a lightweight conducting metal which will dissipate heat into the environment, however other materials such as carbon fiber, or fiberglass, plastic, ceramic, or other materials might be possible in other embodiments.

In another embodiment, the hood 808 may be a different shape, such as hyperboloid or paraboloid. In another embodiment, the LEDs are attached to the Grow Light Device, but are not inside the convexity of the hood, or are themselves placed in separate hoods.

In another embodiment, The LEDs will be of two varieties, producing either red or far red light. Beyond the color distinction, the LEDs may be substantially similar, though there is no requirement that the two be identical. In this preferred embodiment, however, the LEDs are almost indistinguishable from one another until they are turned on. Embodiments described herein may apply to either color LEDs.

One embodiment of the LEDs has at least one row of LED lights which are embedded in a circuit board. The LED lights are arranged approximately centrally in the housing protruding from one face of the housing. The LED lights used in the preferred embodiment are generally "high powered" at preferably 3-watts each, though in some embodiments the lights may be of lower wattage, but should be more than 1-watt and may be more than 3 watts, but would be unnecessary. In the preferred embodiment, the circuit board is attached on one side to an amount of lightweight conducting metal which will dissipate heat into the environment, however other materials such as carbon fiber, or fiberglass, plastic, ceramic, or other materials might be possible in other embodiments.

In a preferred embodiment, this side of the grow light device includes the back side of the attachment point of the HID bulb, and is the attachment point for wiring, including control and power supply wiring. In another embodiment, wiring is directed to another part of the hood, such as the middle. In another embodiment power for the separate lights (HID and LED) may attach at different points on the hood.

Figure 9A:
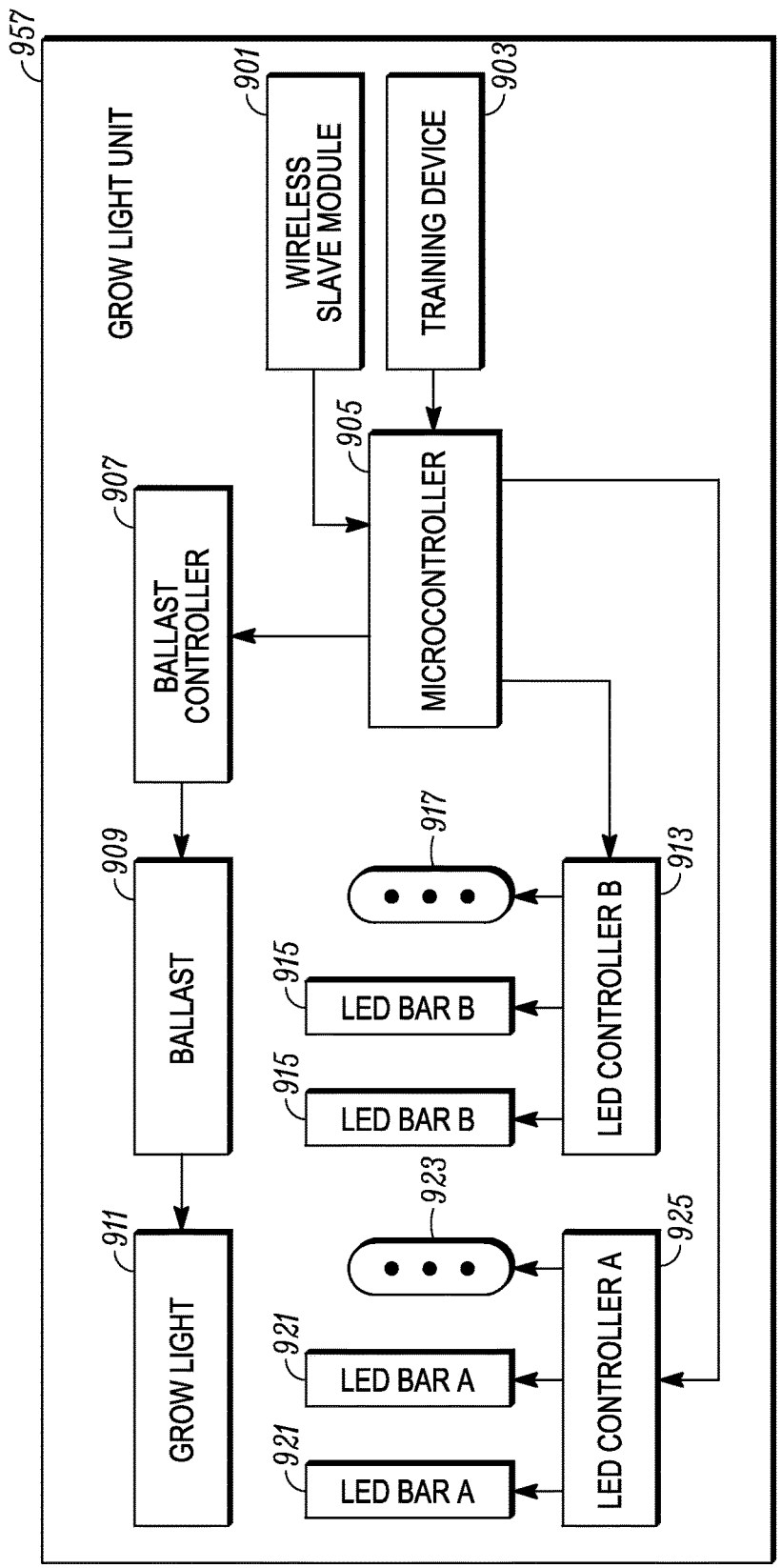
FIG. 9A. is a process flow for a computer-controlled system of one or more grow light devices.
Figure 9B:
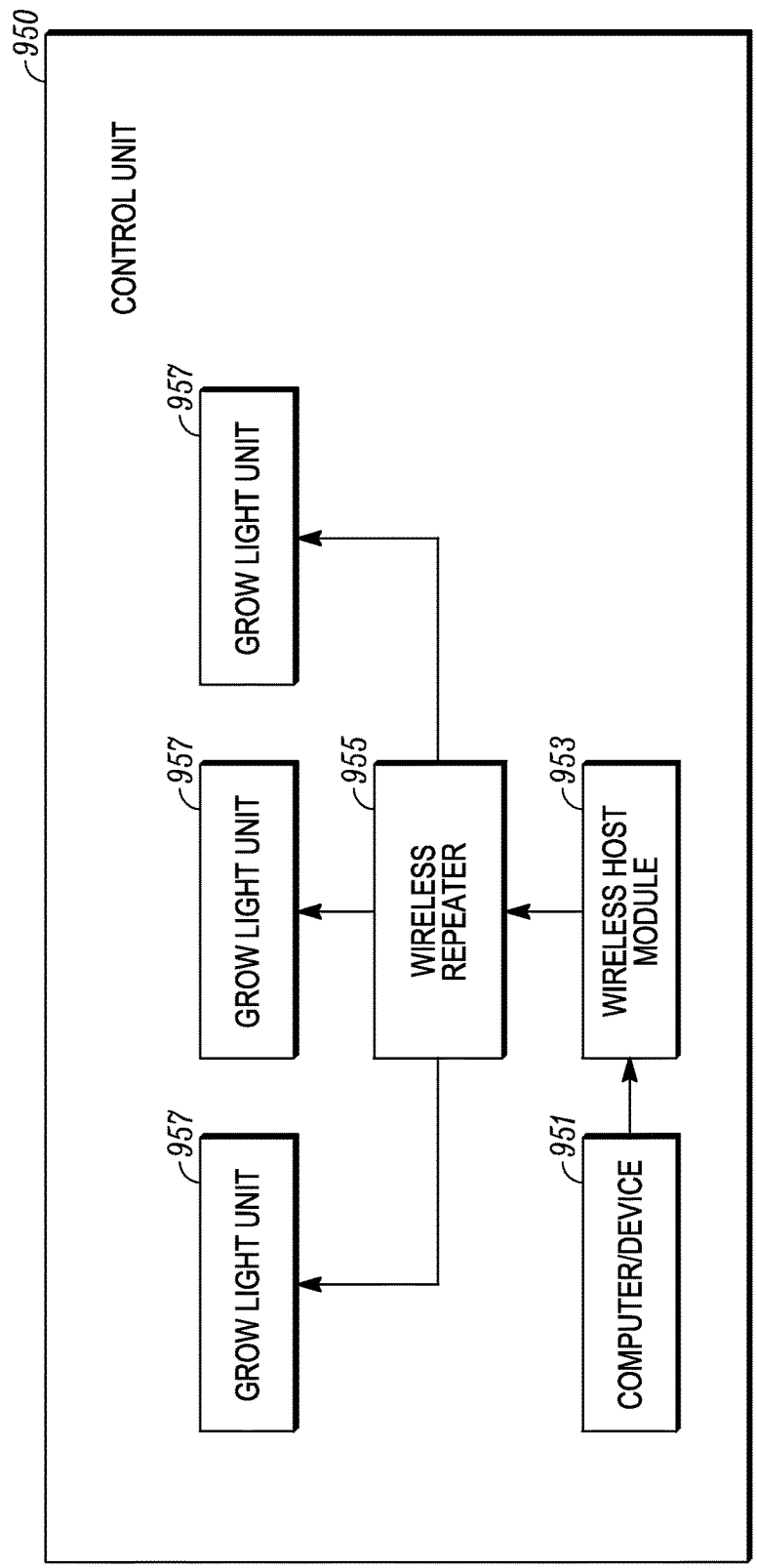
FIG. 9B. is a process flow for a wireless computer-controlled system of one or more grow light devices.

The electrical and power systems which control the LED and HID lights is shown in FIG. 3. There are two separate sources of power, one to the Red light LED and one to the Far Red LED. Other embodiments can have more than two power sources, depending on the size and requirements for the bulbs being used. The preferred embodiment allows multiple independent power sources, varying degrees of lumens, watts and overall power to each set of LED bulbs. Other embodiments, as are shown in FIGS. 9A and 9B, show a computerized timing device which controls the power and duration of each of the independent power sources.

A computerized wireless communication system 950 (see FIG. 9B) communicates wirelessly to more than one computerized control system 957 which controls all grow lights (including HID light and LED grow lights) in a grow light assembly 600. The computer 951, using a common wireless host module 953 and wireless repeater 955 sends software signals to each computerized control system 957 found in FIG. 9A. A wireless slave module 901 or a training device 903 sends at least one signal to a microcontroller 905 which controls all the lights within the assembly 600. The wireless slave module 901 receives wireless signals from a computer 951 according to a specific software program which is programmed to a specific timing method described later. As shown in FIG. 9A, the microprocessor sends signals to both a ballast controller 907 and at least one LED controller (LED controller A 925 and LED controller B 913 in FIG. 9A). The ballast controller 907 allows variability to the current and voltage flowing through from the microprocessor to the HID light 911 because these lights are such high wattage (typically over 1000 W), a ballast 909 is common. The LED Controllers A and B control the timing and voltage to at least two LED bars 921 and 915, like the grow light device 1. In other embodiments, three or more LED bars per LED controllers are set up, such that the third LED bars (923 and 917 as shown in FIG. 9A) may be positioned and wired in parallel to the other two. The LED Controller 925 or 913 will receive the signals and dispense power from the microcontroller 905 based on specific timing per the software provided wirelessly to the wireless slave module 901.

The term "controller" or "microcontroller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The preferred method of use for the grow light assembly 600 involves careful timing and input into either a manual (physically turning a power switch on or off, or plugging or unplugging power) or computerized system 900 and 957 (as described above). The specific nanometer ranges used for the lullaby method are critical, and are as follows: Sunrise (red light) LEDs give off light that is preferably exactly 660 nanometers (nm) but other embodiments may use a range of anywhere between 630 nm to 690 nm; Sunset (far red light)

LEDs give off light that is preferably exactly 730 nm, but other embodiments may use a range of anywhere between 700 nm to 760 nm.

The timing of turning lights on is what makes up the preferred method for using the grow light assembly 600. The steps are:

1) Preferably 15 minutes before HID light, turn on Sunrise (red light) LEDs; As little as 8 minutes and as many as 20 minutes may be given.
2) Preferably 5 minutes of overlap where both Sunrise LEDs and HID (main light) are both on; as little as one minute and as many as 30 minutes may be given for overlap.
3) HID (main) Grow light may remain on to the user's desired length based upon specific grow cycle, but preferably 12 hours.
4) Preferably 5 minutes of overlap where both Sunrise LEDs and HID (main light) are both on; as little as one minute and as many as 30 minutes may be given for overlap.
5) Preferably 15 minutes before HID light, turn on Sunset (far-red light) LEDs; As little as 8 minutes and as many as 20 minutes may be given.

Timing; most growers induce the flowering cycle with a 12 hours on/12 off lighting pattern. Using the aforementioned method however, allows a grower to light plants up to 14 hours because the plants sleep very quickly after the second light effect (sunset/far-red) is completed. Without the second light effect, a plant would take up to 2 hours to sleep. This is because when a plant goes from total light (HID "on") to complete darkness (HID "off") it enters a state of shock and the pores of the plant are not able to close very well. Conversely, in the morning, if the plant is gently awakened by a natural sunrise (red light) it will more completely and quickly be prepared to begin photosynthesis from full sun (HID light).

Computerized Timing; the computer timed embodiment (See FIG. 9A-9B) will control different growing cycles based on the type or strain of plant being grown. This allows the grower to emulate the most favorable growing conditions from anywhere in the world based on what plant or strain of plant they are growing. Meaning, if the grower knew the precise environmental lighting conditions for that grow season based on a farmer's almanac resource, then a grower could theoretically create a very similar lighting environment to a specific location in Afghanistan in 1978 and create a strain of plant that would emulate that of the plant from the past. The computerized aspect of this exists in the embodiment portrayed in FIGS. 9A and 9B. For example, one embodiment of the computer system, in order to simulate the season of Afghanistan 1978, the lighting would be programmed into a software or other readable medium such that the computer/device 951 could read and transmit at least daily light/night durations and wavelengths to the wireless host module 953 and wireless repeater 955 in order to communicate to the computer control system 957 to receive signals into the wireless slave module 901 and finally to the microcontroller 905 which controls how much of which type of light gets applied to the plant. In addition, the moisture and soil environment would also be simulated, but soil and moisture simulation that is well known in the art may be used effectively in combination with the true lighting conditions for simulations like Afghanistan 1978.

While preferred and alternate embodiments have been illustrated and described, as noted above, many changes can be made without departing from the spirit and scope of the LIGHTING DEVICE, SYSTEM AND METHOD FOR GROWING HORTICULTURE INDOORS. Accordingly, the scope of the LIGHTING DEVICE, SYSTEM AND METHOD FOR GROWING HORTICULTURE INDOORS is not limited by the disclosure of these preferred and alternate embodiments. Instead, the scope of the LIGHTING DEVICE, SYSTEM AND METHOD FOR GROWING HORTICULTURE INDOORS should be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. §112 ¶6. In particular, the use of "step of" in the claims herein is not intended to invoke the provisions of U.S.C. §112 ¶6.

I claim:

1. A method for growing plants indoors comprising the following steps:
   place at least one plant in a dark room;
   apply power to at least one sunrise light with a wavelength between 630 nm and 690 nm directed toward the plant for 8 to 20 minutes;
   apply power to at least one high intensity light directed toward the plant for 1 to 30 minutes;
   remove power to all sunrise lights;
   continue power on at least one high intensity light directed toward the plant for 12 hours;
   apply power to at least one sunset light with a wavelength between 700 nm and 760 nm directed toward the plant for 1 to 30 minutes;
   remove power to all high intensity lights;
   continue power to at least one sunset light for 8 to 20 minutes; and
   remove power to all sunset lights.

2. The method of claim 1 wherein the sunrise light requires between 1 and 3 watts.

3. The method of claim 1 wherein the sunset light requires between 1 and 3 watts.

4. The method of claim 1 wherein the high intensity light requires between 500 and 1500 watts.

5. The method of claim 1 wherein the duration of time for each step is controlled manually by a user applying and removing power to each light source.

6. The method of claim 1 wherein the duration of time for each step is controlled by a computer system.

7. The method of claim 6 wherein the computer system comprises:
   at least one computer which communicates timing signals to at least one microcontroller;

at least one microcontroller which timely distributes power to at least one high intensity light and at least one grow light based upon the timing signals it receives from the computer.

8. The method of claim 7 wherein the computer communicates wirelessly to the microcontroller by means of at least one wireless host module, at least one wireless repeater and at least one wireless slave module.

\* \* \* \* \*